Figure 1:
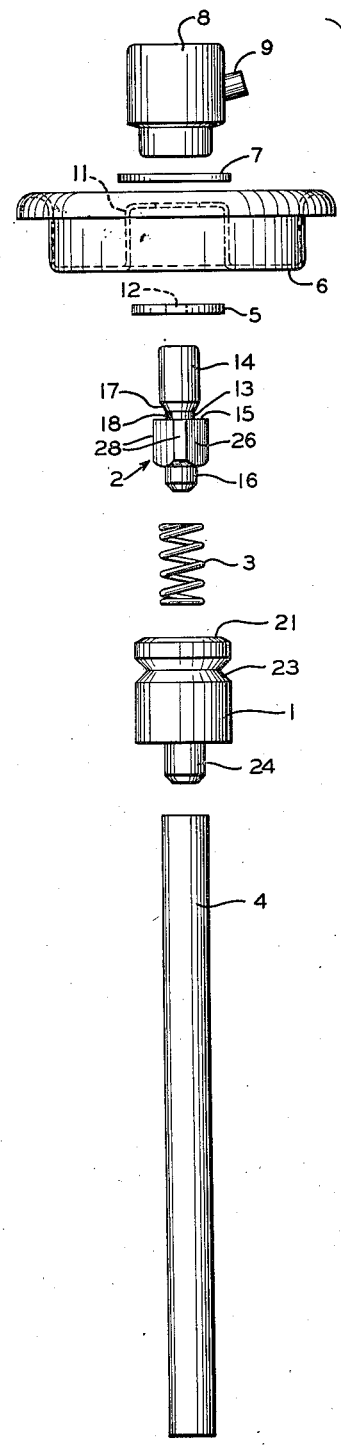

March 17, 1953

R. H. ABPLANALP 2,631,814

VALVE MECHANISM FOR DISPENSING GASES AND LIQUIDS UNDER PRESSURE

Filed Sept. 28, 1949

2 SHEETS—SHEET 1

INVENTOR
*Robert H. Abplanalp*
BY
*Willard S. Curtis*
AGENT

March 17, 1953   R. H. ABPLANALP   2,631,814
VALVE MECHANISM FOR DISPENSING GASES
AND LIQUIDS UNDER PRESSURE
Filed Sept. 28, 1949   2 SHEETS—SHEET 2
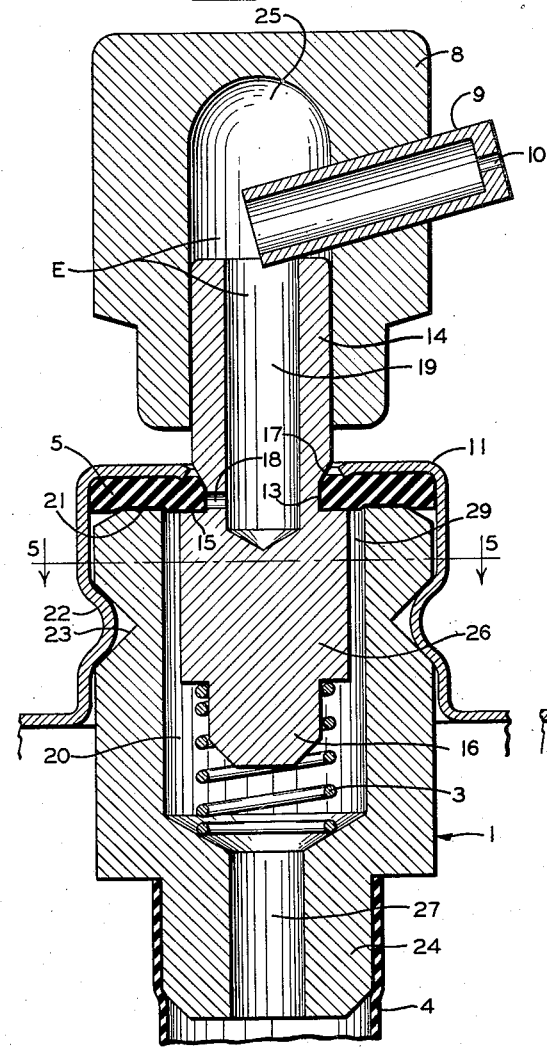
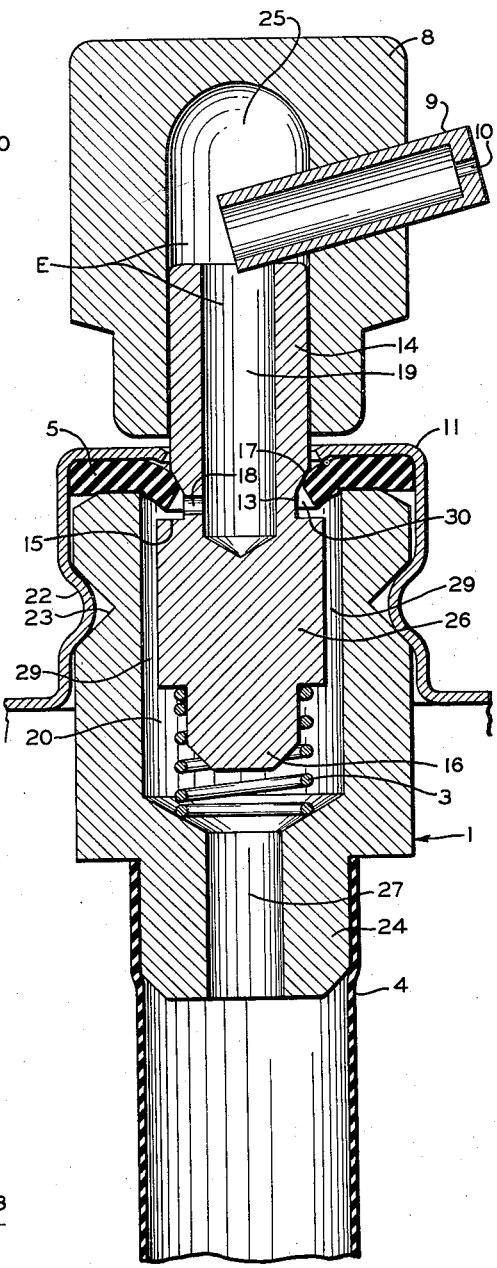
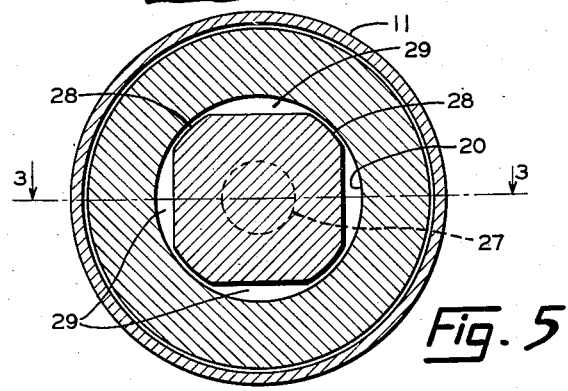
INVENTOR
*Robert H. Abplanalp*
BY
*Willard S. Curtis*
AGENT Patented Mar. 17, 1953

2,631,814

UNITED STATES PATENT OFFICE 2,631,814

VALVE MECHANISM FOR DISPENSING GASES AND LIQUIDS UNDER PRESSURE

Robert H. Abplanalp, Bronx, N. Y.

Application September 28, 1949, Serial No. 118,301

8 Claims. (Cl. 251—137)

My invention relates to improvements in valve mechanisms. Although my invention may be used to control the flow of any type of gas or liquid, it is particularly adapted for use with aerosol dispensers which utilize the principle of mixing a liquified gas with an active liquid in a container under pressure sufficient to force the solution out through the valve; whereupon, the liquified gas vaporizes immediately and breaks away from the active ingredient, tiny particles of which are then propelled and may be directed onto an object in the form of a residual effect as in the case of paints, waxes, lotions, etc.; or, in the case of insecticides, germicides, nasal relief, etc., the propelled active ingredient will remain airborne.

The present invention is adapted for use with either of two well known types of aerosol dispensers. One type, known as a top-filling container, is that having an opening at the top through which it is filled and into which a dispensing valve is then sealed. The second type, the bottom filled container, is one in which the valve is assembled as an integral part of the container in one end thereof and the opposite end is left open for filling, after which it is sealed by any suitable means.

The full utilization of the aerosol principle of dispensing in the insecticidal, germicidal, cosmetic, pharmaceutical, paint, wax, and many other similar fields has been seriously handicapped and retarded because the large variety of formulations which have been developed and which require various sizes, shapes, and types of containers cannot conveniently be used with the types of dispensing valves presently available. Furthermore, the present valves do not provide safe and efficient operation in conjunction with simplicity of assembly to assure low cost in mass production.

A serious deterrent to economical mass production of some of the presently available valves is the necessity of soldering, welding or brazing. By these methods it is absolutely essential that there be not the tiniest opening in the seal or the gas will completely escape and the dispenser will be useless. A further objection to soldering, etc. is that such operations practically preclude the use of aluminum, a highly desirable material for the construction of light-weight dispensers.

Another objectionable feature inherent in some valves is that the actuating plunger is tightly fitted in a sealing gasket which has a tendency to swell under influence of the contents of the container, thus making opening of the valve difficult and, after opening, preventing a proper closing of the valve thereby causing wasteful loss of aerosol.

Prior to my invention most container manufacturers had standardized on a one inch opening in view of available valves and therefore the minimum size of containers has been much too large for use to dispense cosmetics and the like in aerosol form. By utilizing my invention in its form whereby it is assembled as an integral part of a container which is filled and sealed at the bottom, the container diameter may be as little as three eighths of an inch or even less, and the container may be of such length as desired thus enabling the production of a slender pencil shaped aerosol dispenser which would be aesthetically and practicably adapted for the economical and safe dispensing of perfumes, cosmetics and the like.

Essentially, the valve of my invention includes a tubular valve body, a reciprocable core member, a resilient gasket, and a housing in which these parts are mounted—all of these parts being readily adaptable for commercial production.

The valve is mounted ready for use by a single crimping or rolling operation either in a formed cap which is adapted for attachment in the opening of a container, or, in an integral part of a container adapted to be filled from the bottom and then sealed. The design of the core and its relation to the resilient sealing gasket constitutes one of the principal features of novelty of my invention over the prior art. Preferably the core is made from square stock, the lower or body portion having the corners turned to a radius adapted to slide in a counterbore in the valve body. About midway of its length, the core is provided with an annular shoulder formed by turning a necked portion to a diameter less than the distance across the flats. This turned down necked portion extends upwardly to a point substantially less than the thickness of the gasket and then tapers outwardly to a stem portion of larger diameter which extends through the top of the housing and is adapted to support a pressbutton having a spray nozzle mounted therein. The stem portion of the core is bored to a point below the above mentioned shoulder and is connected to the surface of the reduced diameter adjacent the shoulder by a transverse inlet passage. The bore and the internal opening in the press-button serve as an expansion chamber to assure proper vaporization of the aerosol.

The gasket is compressed between the upper annular surface of the valve body and the top of the housing and has a central bore of a lesser diameter than the reduced portion of the core around which it is fitted to seal off the transverse inlet passage. Since the length of the reduced portion is substantially less than the thickness of the gasket the upper inside face of the center bore will be compressed to the contour of the taper.

When the press-button of my valve is depressed the tapered portion of the core causes the internal bore of the gasket to be rolled outwardly at the bottom thus creating an annular clearance area around the shoulder of the core thereby permitting the aerosol to be expelled from the container, through a dip tube, the valve body, and transverse inlet passage into an expansion chamber and hence through a spray nozzle.

It will readily be seen that in my valve any swelling of the gasket will not cause seizure of the core and interference with the normal function of the release mechanism of the dispenser because the core does not slide in the gasket but instead rolls a portion thereof aside. Also, my valve is constructed so that the lower surface of the press-button forms a stop to limit the downward movement for the center-bore of the gasket whereby it cannot slide over the taper and onto the larger diameter of the core.

One object of the present invention is to provide a dispensing valve mechanism readily adapted for economical mass production without the use of soldering, brazing, welding, or threading.

Another object is to provide a dispensing valve mechanism wherein the actuating mechanism responds freely and, upon release, returns instantly to its normal condition.

Another object is to provide a dispensing valve, the sealing parts of which are housed within the dispenser container.

Another object is to provide a valve mechanism adapted for installation either as an integral part of a bottom-filled aerosol dispenser or in a cap adapted to seal a top-filled aerosol dispenser.

Another object is to provide a valve mechanism adapted for use with an aerosol dispenser of slender design.

Another object is to provide a dispenser valve mechanism particularly adapted for the aerosol dispensing of paints, waxes, lotions, and similar type liquids.

Another object is to provide a dispenser valve mechanism particularly adapted for dispensing insecticides, germicides, nasal relief, and similar type liquids in an airborne form.

Another object is to provide a dispensing valve which effectively controls the aerosol vaporization and atomization of all types of aerosol mixtures and includes a valve closure whose operation and performance is not affected by the numerous different chemicals involved in aerosol mixtures.

Other objects and structural details of the invention will be apparent from the following description when read in connection with the accompanying drawings wherein:

Fig. 1 is an exploded view of the several parts of my invention.

Fig. 2 is an elevational view, partly in section, illustrating my valve installed in a conventional aerosol dispenser.

Fig. 3 is a fragmentary, elevational, sectional view on an enlarged scale and illustrates the valve in its closed position.

Fig. 4 is a view similar to Fig. 3 but shows the valve in open position; and

Fig. 5 is a sectional view taken on line 5—5 of Fig. 3 particularly illustrating the relation between the core and the valve body of my invention.

Referring to Figure 1 the elements of one embodiment of my invention include a valve body 1, a reciprocable core 2, a return spring 3, a dip tube 4, a resilient sealing gasket 5, a specially formed top-filling container cap 6, a safety clip 7, and a press-button 8 having fixed therein a discharge nozzle 9.

The cap 6 is of the conventional design used in aerosol dispensers such as illustrated in Figure 2 except for a centrally perforated inverted cup shaped valve housing 11 formed therein and of such diameter as to receive valve body 1 without binding, the edges of the perforation being turned downwardly to form an annular sealing ridge against the upper side of the gasket. Gasket 5 may be made of any resilient material to suit various formulations. Its outside diameter is such as to effect a press fit into the valve housing 11.

A shoulder 15 is formed on the core body by turning a necked portion which comprises a reduced portion 13 and a tapered portion 17. Reduced portion 13, shown as cylindrical, extends from shoulder 15 for a distance substantially less than the thickness of gasket 5 and then tapers outwardly to a stem portion 14.

As a sub-assembly the gasket 5 is pressed over stem 14 of core 2 until its lower surface engages shoulder 15 of the core, and the return spring 3 is pressed onto a depending projection 16 of core 2—the inside diameter of the spring being such as to effect a resilient engagement with projection 16. As best seen in Fig. 3, gasket 5 is substantially thicker than the height of reduced cylindrical portion 13 of the core hence it is compressed to follow the contour of bevelled surface 17 thereby creating a downward pressure of the gasket against shoulder 15 and also effectually sealing a transverse, cross axial inlet passage 18 which extends through reduced portion 13 into an axial bore 19 in stem 14.

The body portion 26 of core 2 and spring 3 thereto attached, of the sub-assembly just described, are then placed in counterbore 20 of valve body 1—the return spring 3 seating in the base of the counterbore 20. The entire assembly is then pressed into housing 11 to a point where the upper edge 21 of body 1 is indented into the underside of gasket 5, and, when thus positioned, an annular crimp 22 is impressed into an annular groove 23 in valve body 1 (Fig. 3) thus, by a simple speedy operation, to secure the valve mechanism in the container cap. To complete the assembly—dip tube 4 is applied to a depending reduced-diameter projection 24 of body 1 and a polyethylene press-button 8, in which has been pre-assembled a discharge nozzle 9, is squeezed onto stem 14 of core 2. The discharge nozzle 9 is so mounted in press-button 8 as to back up against the top of stem 14 thereby providing means for controlling the stroke of core 2.

To avoid accidental discharge, a safety clip 7 of the horseshoe variety may be snapped into engagement with stem 14 beneath press-button 8. While I have found polyethylene a desirable material for press-button 8 I do not wish to be limited to its use because different formulations might require use of different materials. The clip may be of plastic or any other suitable material and must be of sufficient thickness to prevent inadvertent depression of the press-button.

A cavity 25 in press-button 8, together with axial bore 19 in stem 14, combine to form an expansion chamber E in communication with hollow discharge nozzle 9 and a discharge orifice 10.

For dispensing aerosol mixtures such as insecticide having a formulation of approximately 85% propellant and 15% insecticidal active ingredient I have found it desirable to make inlet passage 18 about .015" in diameter and the diameter of the discharge orifice 10 about the same or slightly larger.

To dispense, as a residual effect, heavier type aerosol such as paints having a formulation of 50% propellant and 50% paint, the diameter of inlet passage 18 should be about .020" and that of discharge orifice about .025". Thus it may be seen that various discharge effects may be had by varying, relatively, the diameters of inlet 18 and orifice 10. For spray effects the diameter of the discharge orifice 10 should be as large as or slightly larger than the inlet passage 18.

As may be seen in Figs. 3 and 4 an axial bore 27 is provided through dip tube supporting projection 24 and in communication with counterbore 20.

As shown in Fig. 5 the cross section of the body portion 26 of core 2 is irregularly shaped thereby providing supporting portions 28 adapted to slidably engage the walls of counterbore 20 thus assuring a non-tilting stroke of the core when the press-button is depressed. The irregular shape of body portion 26 of the core in relation to counterbore 20 of the valve body also provides a plurality of passages 29 through which aerosol may pass.

Figure 2:
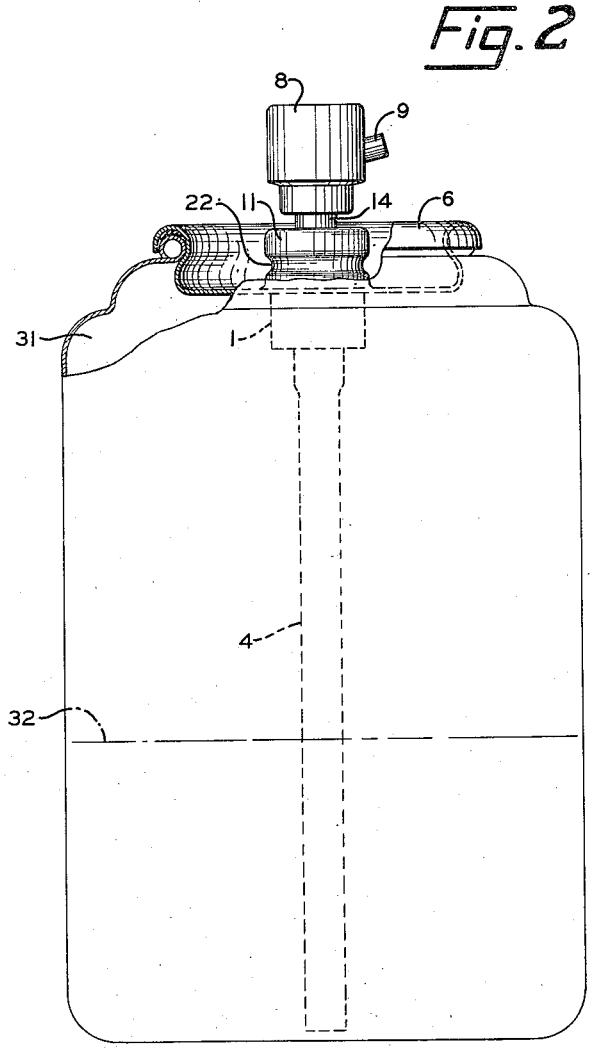

In view of the above description, whereby my valve is applied to a cap adapted for use with a top-filling container as illustrated in Fig. 2, it may readily be seen from Fig. 3 that the identical valve mechanisms can be utilized in a bottom-filling container by forming in the closed end, and as an integral part thereof, a shaped housing 11 just described.

Also, my valve is readily adapted for use with a bottom-filled dispenser having a valve housing formed in the closed end thereof similar to housing 11, the container body proper being a continuation, in the same diameter, of the valve housing thus to provide an aerosol dispenser which, in view of the preferred size and construction of my valve, would be approximately only three eighths of one inch in diameter. According to the latter type of dispenser it would be desirable to apply dip tube 4 before insertion of the valve mechanism for crimping.

Operation

With safety clip 7 (Fig. 1) removed, press-button 8 is manually depressed as shown in Fig. 4 thereby forcing core 2 downwardly against the resistance of spring 3. When core 2 is moved downwardly, tapered portion 17 of the necked portion of stem 14 presses the central portion of gasket 5 downwardly and, because the outer portion of said gasket is gripped between the upper edge 21 of the valve body and the housing 11 therefor, the central portion is flexed thereby causing an enlargement of the lower edge of the inside diameter of the gasket 12. By virtue of the above flexing action, shoulder 15 of core 2 breaks its sealing contact with the underside of the gasket and an annular clearance opening 30 is created thus exposing inlet passage 18 in reduced cylindrical portion 13 of stem 14.

With the valve mechanism in the above described open condition the gas pressure in area 31 (Fig. 2) of the container forces the mixture 32 therein upwardly through dip tube 4, axial bore 27, counterbore 20, passages 29, annular clearance 30, and transverse inlet passage 18 into expansion chamber E where the liquified gas vaporizes and becomes gaseous. The gaseous aerosol mixture travels through the expansion chamber and out through the discharge orifice or spray nozzle; whereupon the gas, upon entering atmospheric temperature and pressure, completely disperses and breaks away from the active ingredient thus leaving minute particles of the active ingredient airborne or to be deposited as a residual effect, according to the desired effect as controlled by the correlated sizes of inlet passage 18 and discharge orifice 10.

This operation is made possible by the novel construction of applicant's valve mechanism. When the parts are as shown in Figure 3, the fact that the center opening of the gasket is of lesser diameter than the reduced portion 13 will cause the gasket to be under radial tension or stress. As a result the wall of the gasket opening is caused to closely hug the necked portion 13 and form a positive seal for the passage 18. An additional seal is also present between the bottom face of the gasket and the shoulder 15 and a still further seal is present between the gasket and the beveled portion 17. Thus, under the normal conditions shown in Figure 3, there are three distinct seals which effectually preclude leakage. Furthermore, as the inner margin of the gasket is confined between the shoulder 15 and the tapered or beveled surface 17, downward movement which may be imparted to the core member will cause it to carry with it the central portion of the gasket so that the latter is bent downwardly and flared radially outwardly into the condition shown in Figure 4. This operation withdraws the inner periphery of the gasket from its sealing relation with the passage 18 and at the same time produces a space between the gasket and the shoulder 15 to break the seal at this point. Nevertheless the seal between the gasket and the tapered surface remains and becomes even tighter than before so that the contents may be dispensed without attendant leakage to the atmosphere between the core member and the gasket.

While I have described what I consider to be a highly desirable embodiment of my invention, it is obvious that many changes in form could be made without departing from the spirit of my invention, and I therefore do not limit myself to the exact form herein shown and described, nor to anything less than the whole of my invention as hereinafter claimed.

What I claim is:

1. A valve mechanism comprising: a valve core formed with a stem portion joined by a reduced neck to a body portion, an annular resilient sealing gasket the central opening of which tightly encircels the neck and normally obturates the inner end of a discharge passage extending from the circumferential surface of the neck and thence longitudinally of the core to the outer end of said stem portion, said neck being exteriorly of a cross axial shoulder defining the outer end of the body portion, and a tapering portion defining the inner end of the stem and extending into the central opening of the gasket to permit axial expansion and swelling of the gasket without binding it between the shoulder and the tapering portion.

2. A valve mechanism comprising: a valve body having an axial passage, an axially movable valve core formed with a stem portion exteriorly of said axial passage but coaxial therewith and joined by a reduced neck to a body portion disposed within said axial passage, an annular resilient sealing gasket the central opening of which tightly encircles the neck and normally obturates the inner end of a discharge passage extending from the circumferential surface of the neck and thence longitudinally of the core to the outer end of said stem portion, said neck being exteriorly of a cross axial shoulder defining the outer end of the body portion, and a tapering portion defining the inner end of the stem portion and extending into the central opening of the gasket to permit axial expansion and swelling of the gasket without binding it between the shoulder and the tapering portion.

3. A valve mechanism comprising: a valve body having an axial passage, an axially movable valve core formed with a stem portion exteriorly of said axial passage but coaxial therewith and joined by a reduced neck to a body portion disposed within said axial passage, an annular resilient sealing gasket the outer periphery of which is held against movement and the central opening of which tightly encircles the neck and normally obturates the inner end of a discharge passage extending from the circumferential surface of the neck and thence longitudinally of the core to the outer end of said stem portion, said neck being exteriorly of a cross axial shoulder defining the outer end of the body portion, and a tapering portion defining the inner end of the stem portion and extending into the central opening of the gasket to permit axial expansion and swelling of the gasket without binding it between the shoulder and the tapering portion and to radially stretch the central opening of the gasket to uncover the discharge passage when the movable valve core is pressed inwardly.

4. A valve mechanism according to claim 1, wherein the stem is provided at its outer end with a discharge orifice and wherein that portion of the discharge passage between the inner end of the discharge passage and said orifice is of greater cross sectional area than either of them to provide an expansion chamber between them.

5. A valve mechanism according to claim 1, wherein the outer end of the stem is provided with a discharge orifice of greater cross sectional area than the inner end of the discharge passage and wherein that portion of the discharge passage between the inner end of the discharge passage and said orifice is of enlarged cross sectional area to form an expansion chamber.

6. A valve mechanism according to claim 1, wherein the shoulder is substantially normal to the axis of the core.

7. A valve mechanism according to claim 1, wherein said neck is formed partially of a cylindrical portion and partially by said tapering portion.

8. A valve mechanism according to claim 3, wherein a spring bears against the core to normally urge the core into a position wherein the discharge passage is sealed.

ROBERT H. ABPLANALP.

REFERENCES CITED

The following references are of record in the file of this patent:

UNITED STATES PATENTS

| Number | Name | Date |
|---|---|---|
| 25,853 | Stickney | Oct. 18, 1859 |
| 34,894 | Lynde | Apr. 9, 1862 |
| 1,207,392 | Frazier | Dec. 5, 1916 |
| 1,961,371 | Mapes | June 5, 1934 |
| 2,204,088 | Kugler | June 11, 1940 |
| 2,372,392 | Pletman | Mar. 27, 1945 |